United States Patent
Gitt (10) Patent No.: US 9,752,654 B2
(45) Date of Patent: Sep. 5, 2017

(54) DUAL-CLUTCH TRANSMISSION (71) Applicant: Daimler AG, Stuttgart (DE)

(72) Inventor: Carsten Gitt, Stuttgart (DE)

(73) Assignee: Daimler AG, Stuttgart (DE)

( * ) Notice: Subject to any disclaimer, the term of this patent is extended or adjusted under 35 U.S.C. 154(b) by 237 days.

(21) Appl. No.: 14/376,201

(22) PCT Filed: Jan. 10, 2013

(86) PCT No.: PCT/EP2013/000051
§ 371 (c)(1),
(2) Date: Aug. 1, 2014

(87) PCT Pub. No.: WO2013/113463
PCT Pub. Date: Aug. 8, 2013

(65) Prior Publication Data
US 2015/0000440 A1    Jan. 1, 2015

(30) Foreign Application Priority Data
Feb. 2, 2012   (DE) .................. 10 2012 001 948

(51) Int. Cl.
*F16H 3/08* (2006.01)
*F16H 3/00* (2006.01)
(Continued)

(52) U.S. Cl.
CPC ............. *F16H 3/08* (2013.01); *F16H 3/006* (2013.01); *F16H 61/68* (2013.01);
(Continued)

(58) Field of Classification Search
CPC ..... F16H 2200/0095; F16H 2200/0082; F16H 2200/0091; F16H 2200/0086;
(Continued)

(56) References Cited

U.S. PATENT DOCUMENTS 5,429,005 A * 7/1995 Fukui .................. F16H 3/12
74/325
5,761,961 A * 6/1998 Krauss .................. B60K 17/02
74/325

(Continued)

FOREIGN PATENT DOCUMENTS

DE   10 2007 049 257 A1   4/2009
DE   10 2009 018 707 A1   10/2010
(Continued)

OTHER PUBLICATIONS

International Search Report dated Feb. 20, 2013 (Two (2) pages).

Primary Examiner — William Kelleher
Assistant Examiner — Gregory Prather
(74) Attorney, Agent, or Firm — Crowell & Moring LLP (57) ABSTRACT A dual-clutch transmission has two input shafts for connection to a power shift clutch, at least one countershaft offset in parallel to the input shafts, an output gearwheel designed as an idler gear and situated coaxially with respect to the countershaft, at least one gearwheel plane having an idler gear situated coaxially with respect to the countershaft, and a shifting unit having a first shift position in which the output gearwheel and the countershaft are connected to one another in a rotationally fixed manner. The shifting unit has a second shift position in which the idler gear and the output gearwheel are directly connected to one another in a rotationally fixed manner.

9 Claims, 3 Drawing Sheets (51) Int. Cl.
*F16H 61/68* (2006.01)
*F16H 3/093* (2006.01)

(52) U.S. Cl.
CPC ........... *F16H 2003/0807* (2013.01); *F16H 2003/0826* (2013.01); *F16H 2003/0931* (2013.01); *F16H 2200/006* (2013.01); *Y10T 74/19228* (2015.01)

(58) Field of Classification Search
CPC ........... F16H 2037/049; F16H 3/091; F16H 2003/007; F16H 2003/0931; F16H 2003/0807; F16H 2003/0826
See application file for complete search history.

(56) References Cited

U.S. PATENT DOCUMENTS

| | | | | |
|---|---|---|---|---|
| 6,250,171 | B1* | 6/2001 | Sperber | F16H 3/006 74/331 |
| 6,591,705 | B1* | 7/2003 | Reik | B60W 10/02 74/335 |
| 6,887,180 | B2* | 5/2005 | Pels | B60K 6/36 477/3 |
| 7,155,994 | B2* | 1/2007 | Gumpoltsberger | B60K 17/08 74/331 |
| 7,383,749 | B2* | 6/2008 | Schafer | F16H 3/006 74/330 |
| 9,297,443 | B2* | 3/2016 | Lee | F16H 3/006 |
| 2002/0104397 | A1* | 8/2002 | Bowen | B60K 6/485 74/329 |
| 2003/0121343 | A1* | 7/2003 | Berger | F16H 61/28 74/340 |
| 2004/0025612 | A1* | 2/2004 | Ahnert | B60W 10/02 74/329 |
| 2007/0193382 | A1* | 8/2007 | Klement | F16H 3/097 74/331 |
| 2007/0199393 | A1* | 8/2007 | Hattori | F16H 3/006 74/331 |
| 2008/0000312 | A1* | 1/2008 | Lang | B60K 6/36 74/340 |
| 2008/0134834 | A1* | 6/2008 | Gitt | F16H 37/046 74/745 |
| 2008/0214351 | A1* | 9/2008 | Katayama | F16H 47/04 475/296 |
| 2009/0272226 | A1* | 11/2009 | Remmler | F16H 3/006 74/665 L |
| 2010/0242646 | A1* | 9/2010 | Gumpoltsberger | F16H 3/006 74/330 |
| 2010/0257967 | A1* | 10/2010 | Rieger | F16H 3/006 74/331 |
| 2010/0294060 | A1 | 11/2010 | Gumpoltsberger et al. | |
| 2011/0088509 | A1* | 4/2011 | Mohlin | F16H 3/006 74/665 E |
| 2014/0000412 | A1* | 1/2014 | Kaltenbach | B60K 6/387 74/661 |
| 2014/0305239 | A1* | 10/2014 | Lubke | F16H 37/046 74/331 |

FOREIGN PATENT DOCUMENTS

| | | |
|---|---|---|
| DE | 10 2011 000 151 A1 | 7/2012 |
| DE | 10 2011 000 152 A1 | 7/2012 |
| DE | 10 2011 050 083 A1 | 11/2012 |

\* cited by examiner

Fig. 1

|     | K1a | K2a | S1a |   |   | S2a |   |   | S3a |   |   | S4a |   | S5a |   |   |
|-----|-----|-----|-----|---|---|-----|---|---|-----|---|---|-----|---|-----|---|---|
|     |     |     | 1 | N | 2 | 1 | N | 2 | 1 | N | 2 | 1 | N | 1 | N | 2 |
| V1a  | ■ |   |   | ○ |   |   | ○ |   | ● |   |   | ● |   |   |   | ● |
| V1a' | ■ |   |   | ○ |   |   | ○ |   |   |   |   | ● |   |   |   | ● |
| V2a  |   | ■ |   | ○ |   |   | ○ |   |   | ○ |   |   | ○ |   |   | ● |
| V3a  | ■ |   | ● |   |   |   | ○ |   |   | ○ |   |   | ○ |   | ○ |   |
| V4a  |   | ■ |   | ○ |   | ● |   |   |   | ○ |   |   | ○ |   | ○ |   |
| V5a  | ■ |   |   | ○ |   |   | ○ |   | ● |   |   |   | ○ | ● |   |   |
| V6a  |   | ■ |   |   | ● |   | ○ |   |   | ○ |   |   | ○ |   | ○ |   |
| V7a  | ■ |   |   | ○ |   |   | ○ |   |   |   | ● |   | ○ | ● |   |   |
| V8a  |   | ■ |   | ○ |   |   | ○ |   |   | ○ |   | ● |   | ● |   |   |
| R1a  | ■ |   |   | ○ |   |   |   | ● | ● |   |   | ● |   |   | ○ |   |
| R1a' | ■ |   |   | ○ |   |   |   | ● |   |   | ● | ● |   |   | ○ |   |
| R2a  |   | ■ |   | ○ |   |   |   | ● |   | ○ |   |   | ○ |   | ○ |   |

DUAL-CLUTCH TRANSMISSION

BACKGROUND AND SUMMARY OF THE INVENTION

Exemplary embodiments of the invention relate to a dual-clutch transmission.

German patent document DE 10 2007 049 257 A1 discloses a dual-clutch transmission having two input shafts provided for connection to a power shift clutch, having at least one countershaft that is offset in parallel to the input shafts, an output gearwheel designed as an idler gear and situated coaxially with respect to the countershaft, at least one gearwheel plane having an idler gear that is situated coaxially with respect to the countershaft, and a shifting unit having a first shift position in which the output gearwheel and the countershaft are connected to one another in a rotationally fixed manner.

Dual-clutch transmissions are likewise known from the publications DE 10 2009 018707 A1 and DE 10 2011 000152 A1, related to the same species, having two input shafts that are provided for connection to a power shift clutch, having at least one countershaft that is offset in parallel to the input shafts, an output gearwheel designed as an idler gear and situated coaxially with respect to the countershaft, at least one gearwheel plane having an idler gear that is situated coaxially with respect to the countershaft, and a shifting unit having a first shift position in which the output gearwheel and the countershaft are connected to one another in a rotationally fixed manner. These dual-clutch transmissions also have at least one additional gearwheel plane ($Z4a$, $Z5a$; $Z4b$, $Z5b$), which in at least one forward gear ($V1a$, $V1a'$, $V1b$, $V1b'$) and/or at least one reverse gear ($R1a$, $R1a'$; $R1b$, $R1b'$) is provided together with the first gearwheel plane ($Z1a$; $Z1b$) for transmitting a force flow and/or power flow.

Exemplary embodiments of the present invention are directed to a dual-clutch transmission having two input shafts provided for connection to a power shift clutch, having at least one countershaft that is offset in parallel to the input shafts, an output gearwheel designed as an idler gear and situated coaxially with respect to the countershaft, at least one gearwheel plane having an idler gear that is situated coaxially with respect to the countershaft, and a shifting unit having a first shift position in which the output gearwheel and the countershaft are connected to one another in a rotationally fixed manner.

The shifting unit has a second shift position in which the idler gear and the output gearwheel are directly connected to one another in a rotationally fixed manner. A simple and compact dual-clutch transmission having a large number of forward gears and a small number of shifting units may be implemented in this way. An "idler gear" should be understood to mean a gearwheel that is situated so as to be rotatable with respect to a shaft, and which is provided for being connected to the shaft in a rotationally fixed manner. This is understood in particular to mean a gearwheel that is permanently connected in a rotationally fixed manner solely via one coupling element of a shifting unit. Furthermore, an "output gearwheel" should be understood to mean a gearwheel that meshes with a gearwheel of an axle drive. In addition, a "shifting unit" should be understood to mean a unit that is provided for connecting at least one idler gear and one shaft and/or two idler gears to one another in a rotationally fixed manner. The term "directly connected in a rotationally fixed manner" should be understood to mean that the idler gear and the output gearwheel are not connected to one another by means of the countershaft, but, rather, are rotatable with respect to the countershaft in the second shift position. The term "provided" should be understood to mean specially designed and/or equipped.

In addition, the dual-clutch transmission includes at least one additional gearwheel plane, which in at least one forward gear and/or at least one reverse gear is provided together with the first gearwheel plane for transmitting a force flow and/or power flow. The appropriate forward gear and/or the appropriate reverse gear may thus be shifted as a so-called winding gear, as the result of which a large number of gears may be achieved with a small number of gearwheel planes.

According to the invention, the dual-clutch transmission has a total of five gearwheel planes maximum and a total of five shifting units maximum, which are provided overall for shifting at least eight forward gears and at least one reverse gear. The dual-clutch transmission may thus have a particularly compact design, and at the same time may have an advantageous shifting logic system.

Furthermore, in accordance with an exemplary embodiment the shifting unit can have a synchronizing element that is permanently connected to the output gearwheel in a rotationally fixed manner. An advantageous shifting logic system may be implemented in this way. A "synchronizing element" should be understood to mean an element of the shifting unit that is provided to accommodate a sliding sleeve of the shifting unit in a rotationally fixed manner in a neutral position, the sliding sleeve being axially displaceable with respect to the synchronizing element. The term "permanently connected in a rotationally fixed manner" should be understood to mean a nonshiftable, rigid connection by means of which the synchronizing element and the output gearwheel always have the same rotational speed.

The idler gear is preferably situated in the axial direction between the synchronizing element and the output gearwheel. The shifting unit may thus be situated in a particularly advantageous manner. The term "in the axial direction between" should be understood to mean that the idler gear is situated between the synchronizing element of the shifting unit and the output gearwheel, along an axis of rotation of the countershaft.

Additionally, in accordance with an exemplary embodiment the idler gear is rotatably mounted on the output gearwheel and/or the synchronizing element. Advantageous mounting of the output gearwheel, and at the same time an advantageous arrangement thereof, may thus be achieved for the idler gear. A connection between the output gearwheel and the synchronizing element preferably passes through the idler gear.

In one advantageous embodiment the shifting unit has a coupling element that is permanently connected to the countershaft in a rotationally fixed manner, and a coupling element that is permanently connected to the idler gear in a rotationally fixed manner. In one particularly advantageous refinement, the shifting unit has three shift positions and one neutral position. The number of shifting units may be further reduced in this way.

One of the additional gearwheel planes particularly preferably has an idler gear that is situated coaxially with respect to the countershaft, and the shifting unit has an additional coupling element that is permanently connected to the additional idler gear in a rotationally fixed manner. The three shift positions may thus be shifted by means of the one shifting unit, as the result of which a large number of gears, and at the same time a small number of shifting units, may be achieved in a particularly simple manner.

Furthermore, in accordance with exemplary embodiments all gearwheel planes have a fixed gear that is permanently connected to one of the input shafts in a rotationally fixed manner. In particular, it is advantageous for the dual-clutch transmission to have an additional countershaft which is offset in parallel to the one countershaft and the input shafts, and an output gearwheel which is permanently connected to the additional countershaft in a rotationally fixed manner.

BRIEF DESCRIPTION OF THE DRAWING FIGURES

Further advantages result from the following description of the drawings. Two exemplary embodiments of the invention are illustrated in the drawings. The drawings, the description, and the claims contain numerous features in combination. Those skilled in the art will also advantageously consider the features individually and combine them into further meaningful combinations.

The figures show the following.

DETAILED DESCRIPTION

Figure 1:
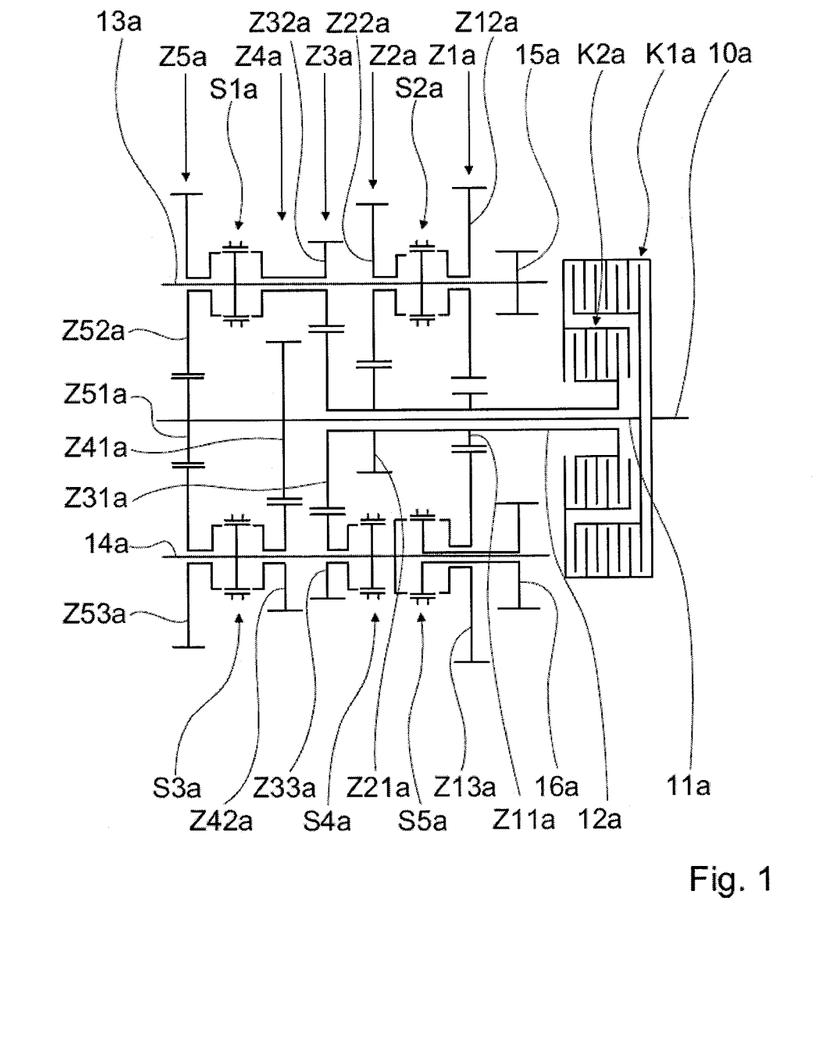
FIG. 1 shows a gear diagram of a dual-clutch transmission according to the invention.

FIG. 1 shows a dual-clutch transmission for a motor vehicle. The dual-clutch transmission includes a drive shaft $10a$ which is provided for the rotationally fixed connection to a drive machine. In addition, the dual-clutch transmission includes an input clutch that includes two power shift clutches $K1a$, $K2a$ that are situated in parallel in the force flow. The dual-clutch transmission has a gearwheel set which is provided for shifting eight forward gears $V1a$-$V8a$. The forward gears $V1a$-$V8a$ are shiftable, at least in sequence, under load. In addition, two reverse gears $R1a$, $R2a$ are shiftable by means of the dual-clutch transmission.

The dual-clutch transmission includes two input shafts $11a$, $12a$ for establishing an operative connection between the drive shaft $10a$ and drive wheels, not illustrated in greater detail. The power shift clutches $K1a$, $K2a$ each include a power shift clutch element on the input side that is connected to the drive shaft $10a$ in a rotationally fixed manner, and a power shift clutch element on the output side. The input shafts $11a$, $12a$ are respectively connected to one of the power shift clutch elements on the output side in a rotationally fixed manner. The input shaft $11a$ is associated with the first power shift clutch $K1a$. The input shaft $12a$ is associated with the second power shift clutch $K2a$.

The drive shaft $10a$ and the two input shafts $11a$, $12a$ are situated in succession along a main direction of extension of the dual-clutch transmission. The two input shafts $11a$, $12a$ are situated coaxially with respect to one another. The drive shaft $10a$ and the input shafts $11a$, $12a$ define a main axis of rotation of the dual-clutch transmission.

For providing the forward gears $V1a$-$V8a$ and the reverse gears $R1a$, $R2a$, the dual-clutch transmission includes a first countershaft $13a$ which is offset in parallel to the input shafts $11a$, $12a$, and a second countershaft $14a$ which is offset in parallel to the input shafts $11a$, $12a$ and the first countershaft $13a$. The countershafts $13a$, $14a$ include an output gearwheel $15a$, $16a$, respectively. The output gearwheel $15a$ is permanently connected to the countershaft $13a$ in a rotationally fixed manner. The output gearwheel $16a$ is designed as an idler gear, and is situated coaxially with respect to the second countershaft $14a$. The output gearwheel $16a$ is rotatably mounted on the countershaft $14a$. The output gearwheels $15a$, $16a$ mesh with a gearwheel, not illustrated in greater detail, via which a torque is transmitted to the drive wheels. The gearwheel may be designed directly as a crown wheel of an axle drive.

The dual-clutch transmission includes five gearwheel planes $Z1a$, $Z2a$, $Z3a$, $Z4a$, $Z5a$. The gearwheel planes $Z1a$, $Z2a$, $Z3a$, $Z4a$, $Z5a$ are situated in succession along the main axis of rotation corresponding to their numbering, the gearwheel plane $Z1a$ being situated closest to the input clutch. The first gearwheel plane $Z1a$ is provided for connecting the second input shaft $12a$ to the first countershaft $13a$ and for connecting the second input shaft $12a$ to the second countershaft $14a$. The second gearwheel plane $Z2a$ is provided for connecting the second input shaft $12a$ to the first countershaft $13a$. The third gearwheel plane $Z3a$ is provided for connecting the second input shaft $12a$ to the first countershaft $13a$ and for connecting the second input shaft $12a$ to the second countershaft $14a$. The fourth gearwheel plane $Z4a$ is provided for connecting the first input shaft $11a$ to the second countershaft $14a$. The fifth gearwheel plane $Z5a$ is provided for connecting the first input shaft $11a$ to the first countershaft $13a$ and for connecting the first input shaft $11a$ to the second countershaft $14a$.

In principle, the dual-clutch transmission may be supplemented with a hybrid drive module, in particular a hybrid drive module having an electric drive machine. For example, it is conceivable for the dual-clutch transmission to have a drive machine that is permanently connected to the drive shaft $10a$. A starter-generator operating mode, for example, may be achieved by means of such a drive machine. For implementing further hybrid variants, it is conceivable for the dual-clutch transmission to have a drive machine that is permanently connected to one of the countershafts $13a$, $14a$. It is likewise conceivable for the dual-clutch transmission to have a drive machine that is permanently connected to one of the input shafts $11a$, $12a$.

Figure 2:
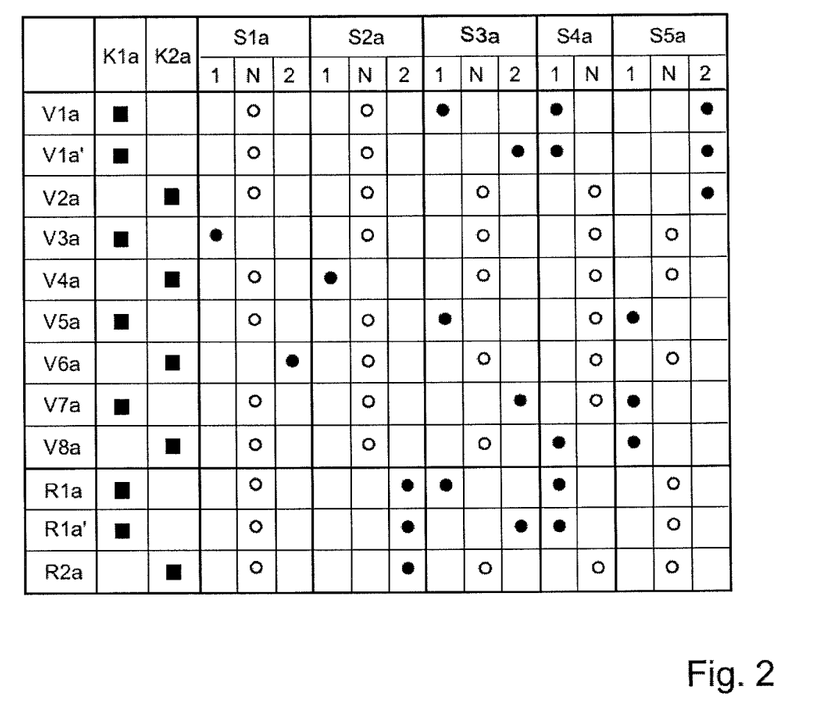
FIG. 2 shows a shifting logic system for the dual-clutch transmission from FIG. 1.

The dual-clutch transmission includes five shifting units $S1a$, $S2a$, $S3a$, $S4a$ for shifting the forward gears $V1a$-$V8a$ and the reverse gears $R1a$, $R2a$. In addition, by means of the five shifting units $S1a$, $S2a$, $S3a$, $S4a$, $S5a$ an alternative first forward gear $V1a'$ is shiftable that has a gear ratio that is between the two forward gears $V1a$, $V2a$. The alternative first forward gear $V1a'$ is likewise power-shiftable with the second forward gear $V2a$. In addition, an alternative reverse gear $R1a'$ may also be provided. A shifting diagram for shifting the forward gears $V1a$-$V8a$, $V1a'$ and the reverse gears $R1a$, $R1a'$, $R2a$ by means of the shifting units $S1a$-$S5a$ is illustrated in FIG. 2.

The shifting units $S1a$, $S2a$, $S3a$, $S5a$ are shiftable on both sides. In the illustrated exemplary embodiment, these shifting units in each case include a sliding sleeve, a synchronizing element permanently connected to the sliding sleeve in a rotationally fixed manner, and two coupling elements. The synchronizing element is situated between the two coupling elements along a shifting direction of the sliding sleeve. The shifting units $S1a$, $S2a$, $S3a$, $S5a$ each have two shift positions and one neutral position. In the first shift position, which is denoted by (1) in FIG. 2, the coupling element facing away from the input clutch, and the synchronizing element of the corresponding shifting unit $S1a$, $S2a$, $S3a$, $S5a$ are connected to one another in a rotationally fixed manner. In the second shift position, which is denoted by (2) in FIG. 2, the coupling element facing the input clutch, and the synchronizing element of the corresponding shifting unit S1a, S2a, S3a, S5a are connected to one another in a rotationally fixed manner. In the neutral position, which is denoted by (N) in FIG. 2, the two coupling elements of the corresponding shifting unit S1a, S2a, S3a, S5a are rotatable with respect to the synchronizing element.

The shifting unit S4a is shiftable on only one side. In the illustrated exemplary embodiment, this shifting unit includes a sliding sleeve, a synchronizing element permanently connected to the sliding sleeve in a rotationally fixed manner, and a coupling element. The synchronizing element and the coupling elements of the shifting units S3a are situated in succession along a shifting direction of the sliding sleeve. The shifting unit S3a has only one shift position and one neutral position. In the shift position, which is denoted by (1) in FIG. 2, the synchronizing element and the coupling element of the corresponding shifting unit S3a are connected to one another in a rotationally fixed manner. In the neutral position, which is denoted by (N) in FIG. 2, the synchronizing element and the coupling element of the shifting unit S3a are rotatable with respect to one another.

The shifting units S1a-S5a are designed, at least in part, as synchronized positive clutches that are shifted by means of the sliding sleeves. In principle, however, other designs such as shifting units that shift in a frictionally engaged and/or force-fit manner are conceivable. In particular, providing each individual shifting unit S1a-S5a with a synchronizing unit may be at least partially dispensed with, in particular when the dual-clutch transmission has a central synchronizing unit situated on the countershafts 13a, 14a, for example, and which is provided for synchronizing the shifting units S1a-S5a. In principle, the shifting units S1a-S5a may also be synchronized by means of the input clutch.

The first gearwheel plane Z1a is designed as the gearwheel plane closest to the input clutch. The first gearwheel plane Z1a is provided for shifting the forward gears V1a, V1a', V2a and the reverse gears R1a, R1a', R2a. The gearwheel plane Z1a includes a fixed gear Z11a, an idler gear Z13a that meshes with the fixed gear Z11a, and an idler gear Z12a that meshes with the idler gear Z13a. The fixed gear Z11a is permanently connected to the input shaft 12a in a rotationally fixed manner. The idler gear Z12a is situated coaxially with respect to the countershaft 13a. The idler gear Z13a is situated coaxially with respect to the countershaft 14a.

The second gearwheel plane Z2a is situated after the gearwheel plane Z1a, starting from the input clutch, along the main direction of extension. The second gearwheel plane Z2a is provided for shifting the forward gear V4a. The gearwheel plane Z2a includes a fixed gear Z21a and an idler gear Z22a that meshes with the fixed gear Z21a. The fixed gear Z21a is permanently connected to the input shaft 12a in a rotationally fixed manner. The idler gear Z22a is situated coaxially with respect to the countershaft 13a.

The third gearwheel plane Z3a is situated after the gearwheel plane Z2a, starting from the input clutch, along the main direction of extension. The third gearwheel plane Z3a is provided for shifting the forward gears V1a, V1a', V4a, V8a and the reverse gears R1a, R1a'. The gearwheel plane Z3a includes a fixed gear Z31a and two idler gears Z32a, Z33a that mesh with the fixed gear Z31a. The fixed gear Z31a is permanently connected to the input shaft 12a in a rotationally fixed manner. The idler gear Z32a is situated coaxially with respect to the countershaft 13a. The idler gear Z33a is situated coaxially with respect to the countershaft 14a.

The fourth gearwheel plane Z4a is situated after the gearwheel plane Z3a, starting from the input clutch, along the main direction of extension. The fourth gearwheel plane Z4a is provided for shifting the forward gears V1a', V7a and the reverse gear R1a. The gearwheel plane Z4a includes a fixed gear Z41a and an idler gear Z42a that meshes with the fixed gear Z41a. The fixed gear Z41a is permanently connected to the first input shaft 11a in a rotationally fixed manner. The idler gear Z42a is situated coaxially with respect to the countershaft 14a.

The fifth gearwheel plane Z5a is situated after the gearwheel plane Z4a, starting from the input clutch, along the main direction of extension. The fifth gearwheel plane Z5a is provided for forming the forward gears V1a, V3a, V5a and the reverse gear R1a. The fifth gearwheel plane includes a fixed gear Z51a and two idler gears Z52a, Z53a that mesh with the fixed gear Z51a. The fixed gear Z51a is permanently connected to the first input shaft 11a in a rotationally fixed manner. The idler gear Z52a is situated coaxially with respect to the countershaft 13a. The idler gear Z53a is situated coaxially with respect to the countershaft 14a.

The shifting unit S1a is situated between the fifth gearwheel plane Z5a and the third gearwheel plane Z3a, and is situated coaxially with respect to the countershaft 13a. The coupling element of the shifting unit S1a facing away from the input clutch is permanently connected to the idler gear Z52a in a rotationally fixed manner. The synchronizing element is permanently connected to the countershaft 13a in a rotationally fixed manner. The coupling element facing the input clutch is permanently connected to the idler gear Z32a in a rotationally fixed manner. In the first shift position of the shifting unit S1a, the idler gear Z52a and the countershaft 13a are directly connected to one another in a rotationally fixed manner. In the second shift position of the shifting unit S1a, the idler gear Z32a and the countershaft 13a are directly connected to one another in a rotationally fixed manner.

The shifting unit S2a is situated between the second gearwheel plane Z2a and the first gearwheel plane Z1a, and is situated coaxially with respect to the countershaft 13a. The coupling element of the shifting unit S3a facing away from the input clutch is permanently connected to the idler gear Z22a in a rotationally fixed manner. The synchronizing element is permanently connected to the countershaft 13a in a rotationally fixed manner. The coupling element facing the input clutch is permanently connected to the idler gear Z12a in a rotationally fixed manner. In the first shift position of the shifting unit S2a, the idler gear Z22a and the countershaft 13a are directly connected to one another in a rotationally fixed manner. In the second shift position of the shifting unit S2a, the idler gear Z12a and the countershaft 13a are directly connected to one another in a rotationally fixed manner.

The shifting unit S3a is situated between the fifth gearwheel plane Z5a and the fourth gearwheel plane Z4a, and is situated coaxially with respect to the countershaft 14a. The coupling element of the shifting unit S3a facing away from the input clutch is permanently connected to the idler gear Z53a in a rotationally fixed manner. The synchronizing element is permanently connected to the countershaft 14a in a rotationally fixed manner. The coupling element facing the input clutch is permanently connected to the idler gear Z42a in a rotationally fixed manner. In the first shift position of the shifting unit S3a, the idler gear Z53a and the countershaft 14a are directly connected to one another in a rotationally fixed manner. In the second shift position of the shifting unit S3a, the idler gear Z42a and the countershaft 14a are directly connected to one another in a rotationally fixed manner.

The shifting unit S4a is situated on a side of the third gearwheel plane Z3a facing the input clutch, and is situated coaxially with respect to the countershaft 14a. The coupling element of the shifting unit S4a is permanently connected to the idler gear Z33a in a rotationally fixed manner. The synchronizing element is permanently connected to the countershaft 14a in a rotationally fixed manner. In the shift position of the shifting unit S4a, the idler gear Z33a and the countershaft 14a are directly connected to one another in a rotationally fixed manner.

The shifting unit S5a is situated between the fourth shifting unit S4a and the first gearwheel plane Z1a, and is situated coaxially with respect to the countershaft 14a. The coupling element of the shifting unit S1a facing away from the input clutch is permanently connected to the countershaft 14a in a rotationally fixed manner. The synchronizing element is permanently connected to the output gearwheel 16a in a rotationally fixed manner. The coupling element facing the input clutch is permanently connected to the idler gear Z13a in a rotationally fixed manner. In the first shift position of the shifting unit S5a, the countershaft 14a and the output gearwheel 16a are directly connected to one another in a rotationally fixed manner. In the second shift position of the shifting unit S5a, the idler gear Z13a and the output gearwheel 16a are directly connected to one another in a rotationally fixed manner, while at the same time the countershaft 14a is rotatable with respect to the output gearwheel 16a and the idler gear Z13a.

The idler gear Z13a is situated in the axial direction between the synchronizing element of the shifting unit S5a and the output gearwheel 16a. The idler gear Z13a of the first gearwheel plane is rotatably mounted on the output gearwheel 16a and the synchronizing element of the shifting unit S5a. The output gearwheel 16a and the synchronizing element have a connection by means of which they are permanently connected to one another in a rotationally fixed manner. The connection is designed in the form of a short hollow shaft through which the countershaft 14a passes. The idler gear Z13a is mounted on the connection between the synchronizing element and the output gearwheel 16a.

The input shaft 12a is permanently connected in a rotationally fixed manner to the fixed gear Z11a of the first gearwheel plane Z1a, to the fixed gear Z21a of the second gearwheel plane Z2a, and to the fixed gear Z31a of the third gearwheel plane Z3a. The input shaft 11a is permanently connected in a rotationally fixed manner to the fixed gear Z41a of the fourth gearwheel plane Z4a and to the fixed gear Z51a of the fifth gearwheel plane Z5a. All shifting units S1a, S2a, S3a, S4a, S5a are situated coaxially with respect to one of the countershafts 13a, 14a. The first countershaft 13a is permanently connected in a rotationally fixed manner to the output gearwheel 15a, to the synchronizing element of the shifting unit S1a, and to the synchronizing element of the shifting unit S3a. The second countershaft 14a is permanently connected in a rotationally fixed manner to the output gearwheel 16a, to the synchronizing element of the shifting unit S3a, to the synchronizing element of the shifting unit S4a, and to the coupling element of the shifting unit S5a facing away from the input clutch.

The shifting logic system of the forward gears V1a-V8a, the additional forward gear V1a', and the reverse gears R1a, R1a', R2a is shown in FIG. 2. In the first eight forward gears V1a-V8a, adjacent forward gears V1a-V8a are power-shiftable with respect to one another. In principle, the first forward gear V1a may be replaced by the forward gear V1a'. The forward gears V1a-V8a, V1a', which in each case are power-shiftable with respect to one another, form a gear pair in each case. The dual-clutch transmission also has additional gear pairs in which two of the forward gears V1a-V8a, V1a' are power-shiftable with respect to one another with omission of forward gears V1a-V8a, V1a' situated in between.

For shifting under load, the forward gear V1a-V8a, V1a' to be shifted is provided by shifting the corresponding shifting units S1a-S5a. The particular power shift clutch K1a, K2a which is associated with the forward gear V1a-V8a, V1a' to be shifted is subsequently successively engaged, while at the same time the other power shift clutch K1a, K2a, which is associated with the V1a-V8a, V1a' to be disengaged, is successively disengaged. Additional power shifts via which the further gear pairs are established result directly from the shifting logic system in FIG. 2.

In the first forward gear V1a, the first power shift clutch K1a is engaged. The shifting unit S3a is shifted into its first shift position. The shifting unit S4a is shifted into its shift position. The shifting unit S5a is shifted into its second shift position. A force flow in the first forward gear V1a is transmitted to the countershaft 14a via the first power shift clutch K1a, the input shaft 11a, the fifth gearwheel plane Z5a, and the shifting unit S3a. Starting from the countershaft 14a, the force flow is transmitted to the input shaft 12a via the shifting unit S4a and the third gearwheel plane Z3a. The force flow is relayed from the input shaft 12a directly to the output gearwheel 16a via the gearwheel plane Z1a and the shifting unit S5a. In the forward gear V1a, the two gearwheel planes Z3a, Z5a are jointly provided for transmitting the force flow.

In the first forward gear V1a', the first power shift clutch K1a is engaged. The shifting unit S3a is shifted into its second shift position. The shifting unit S4a is shifted into its shift position. The shifting unit S5a is shifted into its second shift position. A force flow in the first forward gear V1a is transmitted to the countershaft 14a via the first power shift clutch K1a, the input shaft 11a, the fourth gearwheel plane Z4a, and the shifting unit S3a. Starting from the countershaft 14a, the force flow is transmitted to the input shaft 12a via the shifting unit S4a and the third gearwheel plane Z3a. The force flow is relayed from the input shaft 12a directly to the output gearwheel 16a via the gearwheel plane Z1a and the shifting unit S5a. In the forward gear V1a', the two gearwheel planes Z4a, Z5a are jointly provided for transmitting the force flow.

In the second forward gear V2a, the second power shift clutch K2a is engaged. The shifting unit S5a is shifted into its second shift position. A force flow in the second forward gear V2a is transmitted directly to the output gearwheel 16a via the second power shift clutch K2a, the input shaft 12a, the first gearwheel plane Z1a, and the shifting unit S5a.

In the third forward gear V3a, the first power shift clutch K1a is engaged. The shifting unit S1a is shifted into its first shift position. A force flow in the third forward gear V3a is transmitted to the countershaft 13a via the first power shift clutch K1a, the input shaft 11a, the fifth gearwheel plane Z5a, and the shifting unit S1a. From the countershaft 13a the force flow is led out via the output gearwheel 15a.

In the fourth forward gear V4a, the second power shift clutch K2a is engaged. The shifting unit S2a is shifted into its first shift position. A force flow in the fourth forward gear V4a is transmitted to the countershaft 13a via the second power shift clutch K2a, the input shaft 12a, the second gearwheel plane Z2a, and the shifting unit S2a. From the countershaft 13a the force flow is led out via the output gearwheel 15a.

In the fifth forward gear V5a, the first power shift clutch K1a is engaged. The shifting unit S3a is shifted into its first shift position. The shifting unit S5a is likewise shifted into its first shift position. A force flow in the fifth forward gear V5a is transmitted to the countershaft 14a via the first power shift clutch K1a, the input shaft 11a, the fifth gearwheel plane Z5a, and the shifting unit S3a. From the countershaft 14a the force flow is led out via the shifting unit S5a and the output gearwheel 16a.

In the sixth forward gear V6a, the second power shift clutch K2a is engaged. The shifting unit S1a is shifted into its second shift position. A force flow in the sixth forward gear V6a is transmitted to the countershaft 13a via the second power shift clutch K2a, the input shaft 12a, the third gearwheel plane Z3a, and the shifting unit S1a. From the countershaft 13a the force flow is led out via the output gearwheel 15a.

In the seventh forward gear V7a, the first power shift clutch K1a is engaged. The shifting unit S3a is shifted into its second shift position. The shifting unit S5a is shifted into its first shift position. A force flow in the seventh forward gear V7a is transmitted to the countershaft 14a via the first power shift clutch K1a, the input shaft 11a, the fifth gearwheel plane Z5a, and the shifting unit S3a. From the countershaft 14a the force flow is led out via the shifting unit S5a and the output gearwheel 17a.

In the eighth forward gear V8a, the second power shift clutch K2a is engaged. The shifting unit S4a is shifted into its shift position. The shifting unit S5a is shifted into its first shift position. A force flow in the eighth forward gear V8a is transmitted to the countershaft 14a via the second power shift clutch K2a, the input shaft 12a, the third gearwheel plane Z3a, and the shifting unit S4a. From the countershaft 14a the force flow is led out via the shifting unit S5a and the output gearwheel 17a.

The forward gear V1a' has a smaller gear ratio than the forward gear V1a. In a standard starting strategy the forward gear V1a is therefore selected as the standard starting gear. The forward gear V1a is selected as the starting gear only for starting on uphill slopes and/or for starting under high load, for example when towing a trailer.

In the first reverse gear R1a, the first power shift clutch K1a is engaged. The shifting unit S2a is shifted into its second shift position. The shifting unit S3a is shifted into its first shift position. The shifting unit S4a is shifted into its shift position. A force flow in the first reverse gear R1a is transmitted to the countershaft 14a via the first power shift clutch K1a, the input shaft 11a, the fifth gearwheel plane Z5a, and the shifting unit S3a. The force flow is transmitted from the countershaft 14a to the countershaft 13a via the shifting unit S5a, the gearwheel plane Z1a, and the shifting unit S2a. From the countershaft 13a the force flow is led out via the output gearwheel 17a. In the reverse gear R1a, the two gearwheel planes Z1a, Z5a are jointly provided for transmitting the force flow.

In the reverse gear R1a', the first power shift clutch K1a is engaged. The shifting unit S2a is shifted into its second shift position. The shifting unit S3a is likewise shifted into its second shift position. The shifting unit S4a is shifted into its shift position. A force flow in the reverse gear R1a' is transmitted to the countershaft 14a via the first power shift clutch K1a, the input shaft 11a, the fourth gearwheel plane Z4a, and the shifting unit S3a. The force flow is transmitted from the countershaft 14a to the countershaft 13a via the shifting unit S5a, the gearwheel plane Z1a, and the shifting unit S2a. From the countershaft 13a the force flow is led out via the output gearwheel 17a. In the reverse gear R1a, the two gearwheel planes Z1a, Z4a are jointly provided for transmitting the force flow.

In the second reverse gear R2a, the second power shift clutch K2a is engaged. The shifting unit S2a is shifted into its second shift position. A force flow in the second reverse gear R2a is transmitted to the countershaft 13a via the second power shift clutch K2a, the input shaft 12a, the first gearwheel plane Z1a, and the shifting unit S2a. From the countershaft 13a the force flow is led out via the output gearwheel 17a.

Figure 3:
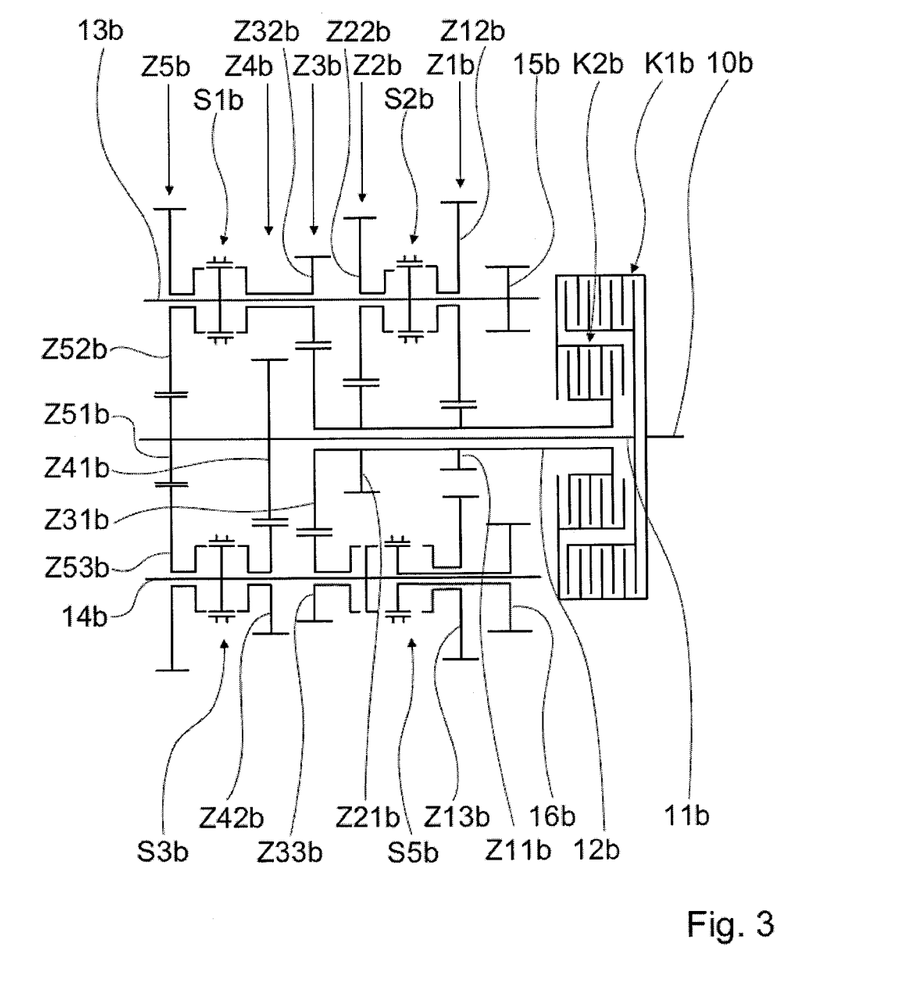
FIG. 3 shows another gear diagram of a dual-clutch transmission according to the invention.

Another exemplary embodiment of the invention is shown in FIG. 3. The following descriptions are limited essentially to the differences between the exemplary embodiments, wherein reference may be made to the description of the exemplary embodiment in FIGS. 1 and 2 with regard to components, features, and functions which remain the same. For distinguishing the exemplary embodiments, the letter "a" in the reference numerals for the exemplary embodiment in FIGS. 1 and 2 is replaced by the letter "b" in the reference numerals for the exemplary embodiment in FIG. 3. With regard to components denoted in the same way, in particular components having the same reference numerals, reference may basically also be made to the drawings and/or description of the exemplary embodiment in FIGS. 1 and 2.

FIG. 3 shows another exemplary embodiment of a dual-clutch transmission according to the invention. The dual-clutch transmission likewise includes a drive shaft 10b, an input clutch having two power shift clutches K1b, K2b, a first input shaft 11b connected downstream from the first power shift clutch K1b, and a second input shaft 12b connected downstream from the second power shift clutch K2b. In addition, the dual-clutch transmission includes two countershafts 13b, 14b that are offset in parallel to the input shafts 11b, 12b.

In addition, the dual-clutch transmission includes five gearwheel planes Z1b, Z2b, Z3b, Z4b, Z5b provided for operatively connecting the input shafts 11b, 12b to the countershafts 13b, 14b, respectively. The first gearwheel plane Z1b includes one fixed gear Z11b and two idler gears Z12b, Z13b. The second gearwheel plane Z2b includes one fixed gear Z21b and one idler gear Z22b. The third gearwheel plane Z3b includes one fixed gear Z31b and two idler gears Z32b, Z33b. The fourth gearwheel plane Z4b includes one fixed gear Z41b and one idler gear Z42b. The fifth gearwheel plane Z5b includes one fixed gear Z51b and two idler gears Z52b, Z53b. In contrast to the preceding exemplary embodiment, in the first gearwheel plane Z1b the fixed gear Z11b meshes with the idler gear Z12b, which in turn meshes with the idler gear Z13b. All fixed gears Z11b, Z21b, Z31b, Z41b, Z51b are permanently connected to one of the input shafts 11b, 12b in a rotationally fixed manner. The idler gears Z12b, Z13b, Z22b, Z32b, Z33b, Z42b, Z52b, Z53b are situated coaxially with respect to one of the countershafts 13b, 14b.

In addition, in contrast to the preceding exemplary embodiment, the dual-clutch transmission includes only four shifting units S1b, S2b, S3b, S5b. The shifting units S1b, S2b, S3b are situated analogously to the preceding exemplary embodiment. The shifting unit S5b has three shift positions and one neutral position. The shifting unit S5b includes a synchronizing element that is permanently connected to the output gearwheel 16b in a rotationally fixed manner. In addition, the shifting unit S5b includes a coupling element that is permanently connected to the idler gear Z33b in a rotationally fixed manner, a coupling element that is permanently connected to the countershaft 14b in a rotationally fixed manner, and a coupling element that is permanently connected to the idler gear Z13b in a rotationally fixed manner. In the first shift position, the shifting unit S5b connects the idler gear Z33b to the countershaft 14b. In the second shift position, the shifting unit S5b connects the idler gear Z13b to the countershaft 14b. In the third shift position, the shifting unit S5b connects the idler gear Z13b to the output gearwheel 16b. In the neutral position, the three coupling elements and the synchronizing element are rotatable with respect to one another. A shifting logic system of the dual-clutch transmission illustrated in FIG. 3 corresponds to that of the preceding exemplary embodiment.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A dual-clutch transmission, comprising:
   a power shift clutch;
   two input shafts configured for connection to the power shift clutch;
   at least one countershaft that is offset in parallel to the two input shafts;
   an output gearwheel which is configured as a first idler gear and situated coaxially with respect to the at least one countershaft;
   a first gearwheel plane having a second idler gear that is situated coaxially with respect to the at least one countershaft;
   a shifting unit having a first shift position in which the output gearwheel and the at least one countershaft are connected to one another in a rotationally fixed manner, wherein the shifting unit has a second shift position in which the second idler gear and the output gearwheel are directly connected to one another in a rotationally fixed manner;
   at least one additional gearwheel plane, which in at least one forward gear ratio or at least one reverse gear ratio is provided together with the first gearwheel plane for transmitting a force flow or power flow,
   wherein the dual-clutch transmission has a total of five gearwheel planes each connecting one of the input shafts to the at least one countershaft and a total of five shifting units maximum for shifting at least eight forward gear ratios and at least one reverse gear ratio.

2. The dual-clutch transmission of claim 1, wherein the shifting unit has a synchronizing element permanently connected to the output gearwheel in a rotationally fixed manner.

3. The dual-clutch transmission of claim 2, wherein the second idler gear is situated in an axial direction between the synchronizing element and the output gearwheel.

4. The dual-clutch transmission of claim 2, wherein the second idler gear is rotatably mounted on the output gearwheel or the synchronizing element.

5. The dual-clutch transmission of claim 1, wherein the shifting unit has a coupling element permanently connected to the countershaft in a rotationally fixed manner, and a coupling element permanently connected to the second idler gear in a rotationally fixed manner.

6. The dual-clutch transmission of claim 5, wherein one of the at least one additional gearwheel planes has a third idler gear situated coaxially with respect to the at least one countershaft, and the shifting unit has an additional coupling element permanently connected to the third idler gear in a rotationally fixed manner.

7. The dual-clutch transmission of claim 1, wherein the shifting unit has three shift positions and one neutral position.

8. The dual-clutch transmission of claim 1, wherein all gearwheel planes have a fixed gear permanently connected to one of the input shafts in a rotationally fixed manner.

9. The dual-clutch transmission of claim 1, further comprising:
   an additional countershaft offset in parallel to the at least one countershaft and the input shafts; and
   an output gearwheel permanently connected to the additional countershaft in a rotationally fixed manner.

* * * * *